United States Patent [19]

Yamaguchi et al.

[11] Patent Number: 5,378,021
[45] Date of Patent: Jan. 3, 1995

[54] COLLAPSIBLE STEERING COLUMN APPARATUS

[75] Inventors: Mikio Yamaguchi, Takasaki; Takahiro Saitoh, Maebashi, both of Japan

[73] Assignee: NSK Ltd., Tokyo, Japan

[21] Appl. No.: 25,752

[22] Filed: Mar. 3, 1993

[30] Foreign Application Priority Data

Mar. 13, 1992 [JP] Japan .................. 4-21980[U]

[51] Int. Cl.$^6$ .................................... B62D 1/11
[52] U.S. Cl. ............................ 280/777; 280/775; 188/377; 74/493
[58] Field of Search ............. 280/777, 775; 188/377; 74/492, 493

[56] References Cited

U.S. PATENT DOCUMENTS

| 3,482,466 | 12/1969 | Orlich et al. | 280/777 |
|---|---|---|---|
| 3,785,671 | 1/1974 | Salewsky | 280/87 |
| 3,822,608 | 7/1974 | Murase et al. | 74/493 |
| 3,980,314 | 9/1976 | Kopf | 280/777 |
| 3,983,963 | 10/1976 | Nakamura | 188/377 |
| 4,194,411 | 3/1980 | Manabe et al. | 74/492 |
| 4,221,413 | 9/1980 | Bonnetain | 188/377 |
| 4,844,213 | 7/1989 | Travis | 188/377 |
| 4,901,592 | 2/1990 | Ito et al. | 280/777 |
| 5,005,863 | 4/1991 | Drefahl | 280/777 |

FOREIGN PATENT DOCUMENTS

| 49-2728 | 1/1974 | Japan . |
|---|---|---|
| 59-46826 | 11/1984 | Japan . |
| 59-46827 | 11/1984 | Japan . |
| 63-63259 | 4/1988 | Japan . |
| 63-76578 | 5/1988 | Japan . |
| 64-16970 | 1/1989 | Japan . |
| 2-22384 | 6/1990 | Japan . |
| 2-82669 | 6/1990 | Japan . |

*Primary Examiner*—Mitchell J. Hill
*Assistant Examiner*—Christopher P. Ellis
*Attorney, Agent, or Firm*—Shapiro and Shapiro

[57] ABSTRACT

A collapsible steering column apparatus comprises a steering column capable of receiving, a steering shaft having one end to which a steering wheel is fixed; and an energy absorbing member composed of a plastically deformable material and having its front end joined to a partial outer peripheral surface of the steering column and its rear end joined to a portion fixed to a vehicle body. The energy absorbing member is formed by punching out a sheet of metal plate to achieve a laterally undulating configuration with the extent of the undulations laterally of the energy absorbing member varying along its length. When applying an impulsive force to thrust the steering column forward due to a secondary shock in a collision, the energy absorbing member permits a forward displacement of the steering column while being plastically deformed in such a direction as to extend the undulations thereof.

9 Claims, 7 Drawing Sheets

COLLAPSIBLE STEERING COLUMN APPARATUS

BACKGROUND OF THE INVENTION

1. Field of the Invention

The present invention relates to a collapsible steering column apparatus in which a steering column has a structure capable of absorbing an impact when collided into by a driver, thereby protecting the life of the driver in a collision.

RELATED BACKGROUND ART

A collision of vehicles involves a so-called primary shock wherein the vehicle collides with another vehicle or the like and a so-called secondary shock subsequently induced wherein the driver strikes against a steering wheel. An impact that the driver undergoes upon this secondary shock should be minimized for protecting the life of the driver. A general practice which meets this purpose is that a so-called collapsible steering shaft is constructed to reduce an overall length thereof when undergoing a strong impact.

A known conventional collapsible steering column apparatus employed for the purpose described above is disclosed in, e.g., Japanese Utility Model Application Laid-Open No. 63-76578. This known conventional collapsible steering column apparatus is constructed as shown in FIGS. 12-15.

Referring to FIG. 12, a steering wheel 2 is fixed to the upper end of a steering shaft 1. The steering shaft 1 is rotated in torsional directions by handling this steering wheel 2. This steering shaft 1 assumes a collapsed state (not shown), wherein an overall length thereof is reduced, when undergoing an axial impact.

The steering shaft is inserted into a cylindrical steering column 3. A mid-part and a lower end of the steering column 3 are supported on some portions of a vehicle body 4 such as a lower surface of a dash board through an upper support bracket 6 and a lower support bracket 5. The steering column 3 also assumes a collapsed state, wherein an overall length thereof is reduced, when receiving and absorbing the axial impact.

Fitting plate members 7 formed by bending a metal plate serve to fit the upper support bracket 6 to the vehicle body 4. The fitting plate members 7 are provided on both sides of this upper support bracket 6 fixedly welded to an outer peripheral surface of the mid-part of the steering column 3. Each fitting plate member 7 has a U-shaped notch 8 cut in one edge (on the side of the steering wheel 2) thereof.

A lock member 9 is made of an easy-to-slide material such as a synthetic resin in an elongated U-shape. The lock member 9 is fitted to an exterior of one edge of each fitting plate member 7 so as to cover the notch 8. Then, a bolt 10 penetrates a through-hole 15 formed in this lock member 9 and the notch 8 described above. The bolt 10 is screwed into a screw hole bored in the vehicle body 4. The fitting plate member 7 is firmly clamped with the lock member 9 by fastening the bolt 10. The upper support bracket 6 is thus supported on the vehicle body 4 through this lock member 9.

Further, one end of each of a pair of energy absorbing members 11 is welded to the fitting plate member 7. A through-hole 16 is formed in the other end of each energy absorbing member 11. The bolt 10 is inserted into this through-hole 16. The energy absorbing member 11 is made of a plastically deformable band-like plate material. The energy absorbing member 11 includes a U-shaped bending part 12 formed at the midpart thereof. This bending part 12 is clamped from above and blow by the fitting plate member 7 and a guide plate 13 which will be mentioned later.

The guide plates 13 formed by press-molding a metal plate are fixedly welded to lower portions of the fitting plate members 7 on both side surfaces of the upper support bracket 6. A guide space 14 for guiding the bending part 12 of the energy absorbing member 11 is formed between the upper surface of each guide plate 13 and the lower surface of the fitting plate member 7.

The thus constructed conventional collapsible steering column apparatus works to protect the driver by the following action at the moment of an accident of collision. To start with, if an impact is applied to the steering wheel 2 at the moment of the secondary shock in a collision of the vehicle, this impact is immediately conveyed to the steering column 3. This steering column 3 is forcibly thrust in the axial direction.

If the impulsive force applied to the steering column 3 in the axial direction in this way is larger than a frictional force acting between the fitting plate member 7 and the lock member 9, the notch 8 cut in the fitting plate member 7 separates from the bolt 10. The steering column 3 can be thereby brought into a free displacement.

As a result, the steering column 3 makes a forward displacement (downward to the left in FIG. 12) in the axial direction on the basis of the impulsive force. With this displacement, as illustrated in FIG. 15, the energy absorbing member 11 tends to elongate. As explained above, the energy absorbing member 11 elongates from a state shown in FIG. 12 up to a state shown in FIG. 15. On this occasion, the bending part 12 formed at the mid-part of the energy absorbing member 11 shifts toward one end (left in FIG. 15) connected to the fitting plate member 7 from the other end (right in FIG. 15) connected to the bolt 10. When shifted, energy absorbing member 11 is plastically deformed, thus absorbing the impact applied via the steering wheel 2 to the steering column 3.

The conventional collapsible steering column apparatus constructed and functioning in the abovementioned manner presents the following drawbacks.

Namely, simultaneously when an overall length of the collapsible steering column 3 is reduced upon the secondary shock, the fitting plate member comes off the lock member 9 because of the two members 7, 9 sliding on each other. However, a force needed for starting the reduction of the overall length of the steering column 3 and a force required for starting the slide of the fitting plate member 7 on the lock member 9 are larger than forces acting after starting both the reduction and the slide thereof. Hence, the conventional structure may induce a possibility to apply a relatively great impulsive force to the driver's body.

The impulsive force applied to the driver's body should be reduced as much as possible at the moment of the secondary shock. For this purpose, it is preferable that the force needed for causing the forward displacement of the steering wheel 2 be decreased instantaneously when starting this displacement but be increased with a progression of the displacement at the moment of the secondary shock.

To attain this, as disclosed in Japanese Patent Publication Nos. 49-2728 and 59-46826, Japanese Utility Model Application Laid-Open Nos. 63-63259, 64-16970 and 2-82669 and Japanese Utility Model Publication No. 2-22384, there have been proposed structures to reduce the force necessary for starting the displacement of the steering column 3 which holds the steering shaft 1 or to gradually increase the force needed for causing the displacement of the steering column 3.

It is, however, difficult to ensure a sufficient stroke of the steering column 3 in the case of the conventional structure disclosed in the publications given above. An impact absorbing capability at the moment of the secondary shock is deficient. Alternatively, the member for absorbing the impact is easy to rupture. The impact absorbing capability at the moment of the secondary shock is still insufficient.

SUMMARY OF THE INVENTION

Accordingly, it is a primary object of the present invention to provide a construction which obviates the foregoing drawbacks. A more particular object of the invention is to provide a collapsible steering column apparatus, as in the conventional collapsible steering column apparatus having, a steering column capable of receiving an insertion of a steering shaft having its one end to which a steering wheel is fixed, and an energy absorbing member composed of a plastically deformable material and having its front end joined to a partial outer peripheral surface of the steering column and its rear end joined to a portion fixed to a vehicle body, but in which the energy absorbing member is uniquely designed to avoid the above-discussed drawbacks of the conventional apparatus. Especially in the collapsible steering column apparatus of this invention, the energy absorbing member is characteristically formed by punching out a sheet of metal plate to provide a laterally undulating configuration with the extent of the undulations laterally of the energy absorbing member varying along its length.

In the case of the thus constructed collapsible steering column apparatus of this invention, when applying an impulsive force to thrust the steering column forward due to a secondary shock in a collision, the energy absorbing member permits a forward displacement of the steering column while being plastically deformed in such a direction as to extend (pullout) the undulations thereof.

The force required for starting the elongation of the energy absorbing member does not increase so much. Hence, the forward displacement of the steering column is smoothly started. The impulsive force applied to the driver's body can be relieved at the instant of the secondary shock. In addition to the energy absorbing member having a laterally undulating configuration, the extend of the undulations laterally of the energy absorbing member preferably decreases progressively, with each undulation, from the rear end toward the front end of the energy absorbing member. Therefore, the displacement (elongation) is smoothly started, and the force necessary for causing a further displacement increases with a progression of the displacement.

Hence, the force needed for causing the displacement of the steering column at the moment of the secondary shock is small at the initial stage but gradually increases with the progression of the displacement. It is therefore possible to efficiently receive the impulsive force applied to the body of the driver who strikes against the steering wheel and also prevent a serious injury from occurring to the driver's body.

The collapsible steering column apparatus according to the present invention is constructed as described above and is therefore capable of minimizing the damage that the driver is to undergo by preventing the large impulsive force from being applied to the driver's body at the moment of the secondary shock due to collision.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

In embodiments which will hereafter be discussed, the same portions as those in the prior art are marked with the like symbols.

Figure 1:
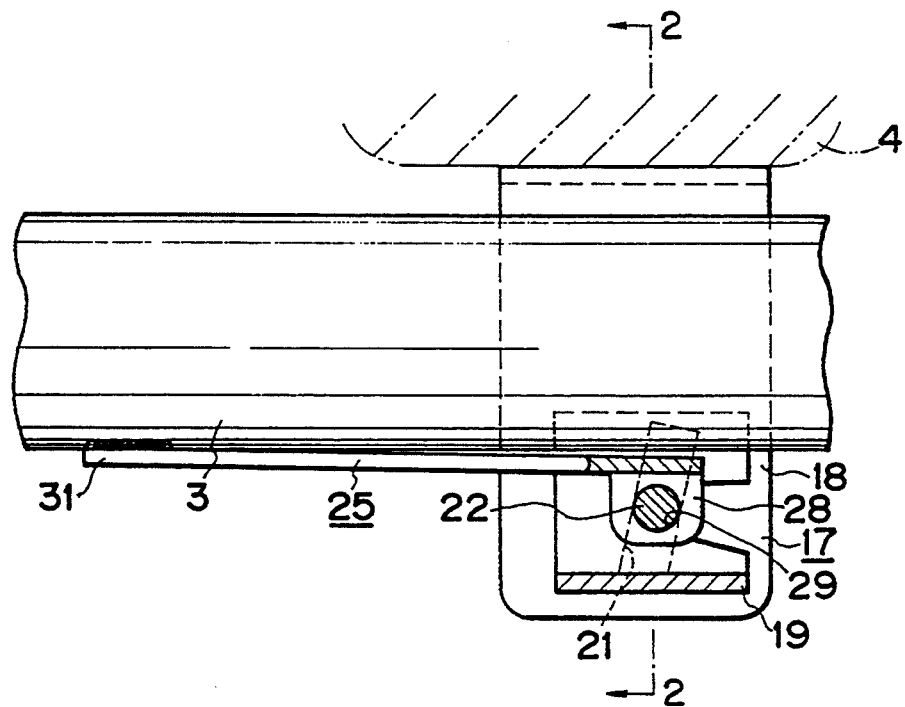
FIG. 1 is a principal side view in vertical section, showing a first embodiment of this invention.
Figure 2:
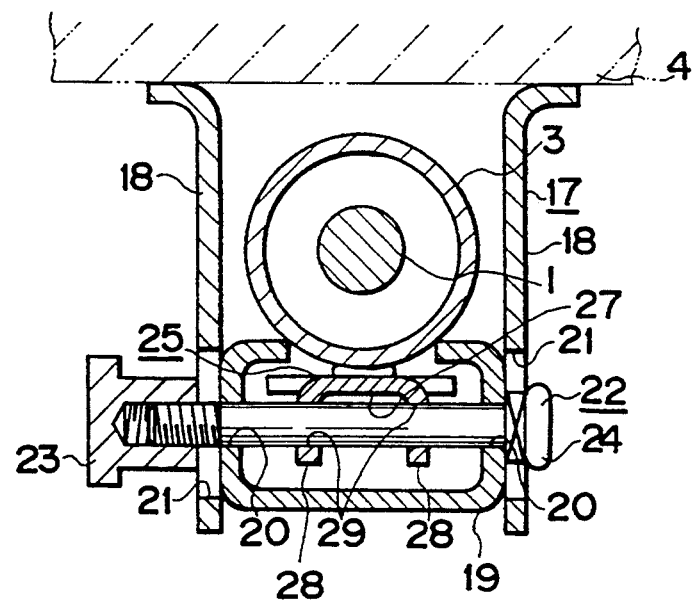
FIG. 2 is a sectional view taken along the line 2—2 in FIG. 1.
Figure 3:
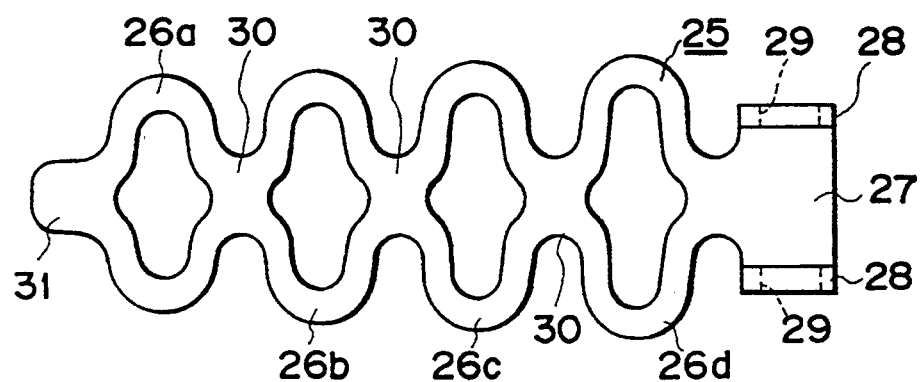
FIG. 3 is a view illustrating an energy absorbing member as viewed from below in FIG. 1.
Figure 12:
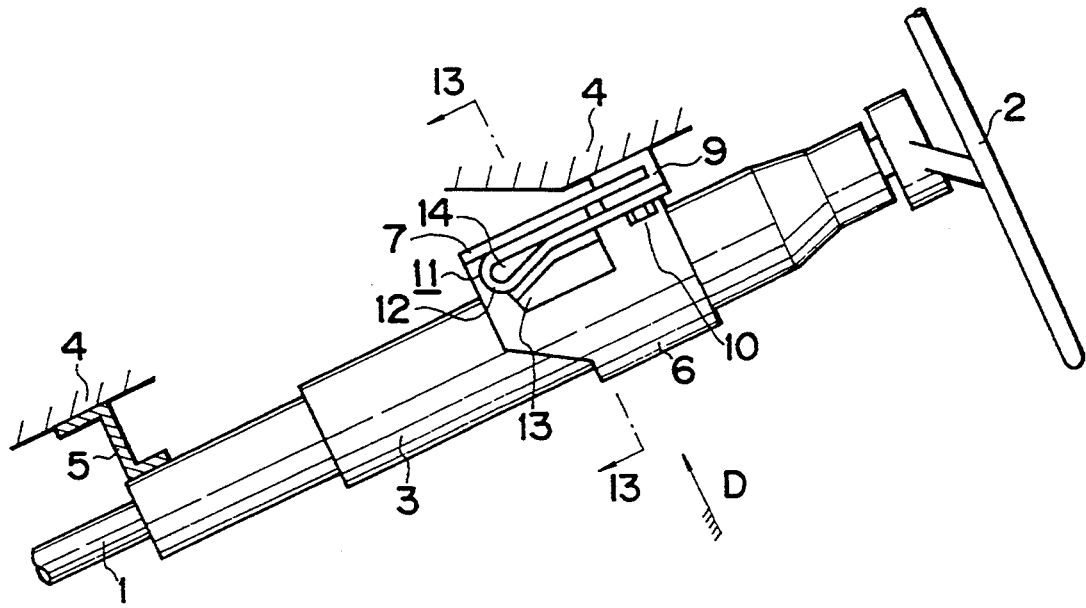
FIG. 12 is a side view illustrating a conventional collapsible steering column apparatus.
Figure 13:
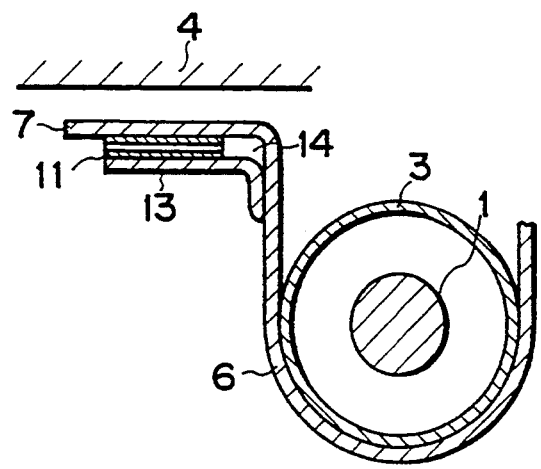
FIG. 13 is a sectional view taken along the line 13—13 in FIG. 12.
Figure 14:
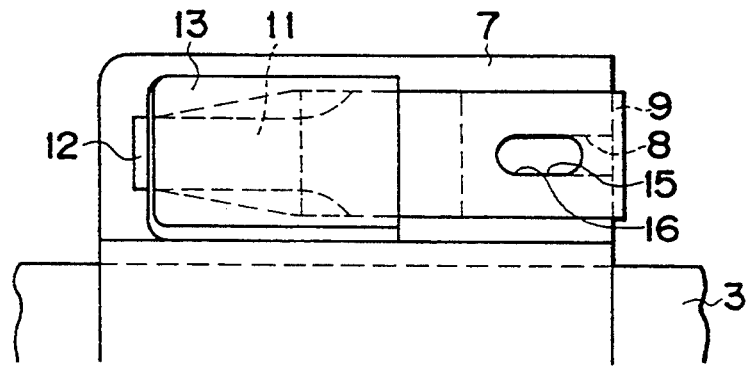
FIG. 14 is a view taken along the arrowed line D in FIG. 12.
Figure 15:
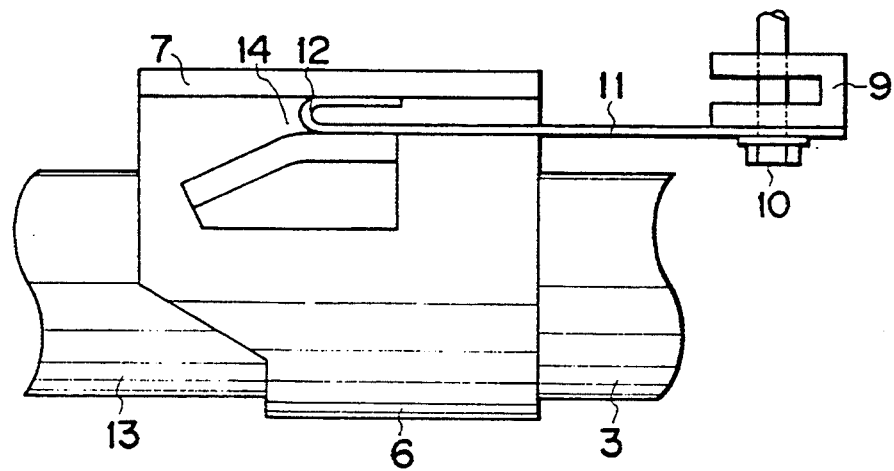
FIG. 15 is a side view illustrating a portion corresponding to the central part in FIG. 12 in a state after the impact has been absorbed at the time of a collision.

FIGS. 1~3 are views of a first embodiment of the present invention, showing such a structure that a collapsible steering column apparatus incorporates a tilt mechanism for adjusting a height position of a steering wheel 2 (FIG. 12). The steering wheel 2 is fixed to one end of a steering shaft 1 (FIGS. 2 and 12). The steering shaft 1 is insertable into a steering column 3. The steering column 3 includes a collapsible structure (illustration is omitted) formed in the mid-part thereof, whereby the steering column 3 is collapsed throughout its overall length when an impulsive force acting in the axial direction is applied.

A support bracket 17 supports the steering column 3 on a vehicle body. A lift bracket 19 fixedly welded to a lower surface of the mid-part of the steering column 3 is sandwiched between a pair of lateral support walls (sidewalls) 18, 18 in FIG. 2. Circular holes 20, 20 are formed in side walls of this lift bracket 19. Slots 21, 21 that elongate in the up-and-down direction are formed in portions, matching with the circular holes 20, 20, of the support walls 18, 18. An adjust nut 23 is fitted to the end of an adjust bolt 22 penetrating the holes 20, 21 from one side to the other side (from right to left in FIG. 2). This adjust bolt 22 is so constructed as not to rotate even when raised and lowered along the slots 21, 21 with an engagement of its head 24 with a side edge of one slot 21.

Further, the adjust nut 23 is rotatable with the aid of an unillustrated tilt lever. Hence, the adjust nut 23 is rotated based on an operation of the tilt lever. If a spacing between this adjust nut 23 and the head 24 is varied, the up-and-down positions of the steering wheel 2 can be adjusted by fixing, to the support bracket 17, the steering column 3 to which the lift bracket 19 is fixed or releasing the fixation.

A rear end (right end in FIGS. 1 and 3, wherein a to-and-fro bearing is set in the traveling direction of the vehicle) of an energy absorbing member 25 is fitted to the exterior of the mid-part of the adjust bolt 22 disposed inwardly of the lift bracket 19. A front end of this energy absorbing member 25 is fixedly welded to a lower surface of the mid-part of the steering column 3. Consequently, the rear end of the energy absorbing member 25 is supported through the adjust bolt 22 and the support bracket 17 on the vehicle body 4 which does not make a displacement when the driver collides with the steering wheel. The front end of the energy absorbing member 25 is supported on the steering column 3 which makes a forward displacement when the driver collides with the steering wheel.

This energy absorbing member 25 exhibits a configuration as shown in, e.g., FIG. 3. More particularly, the energy absorbing member 25 has a laterally undulating configuration and is constructed as described below. A sheet of metal plate having a plasticity is punched out. A plurality of ring parts 26a~26d, each generally in the form of an ellipse elongated in the widthwise or lateral direction of the plate (in the up-and-down direction in FIG. 3), are connected to one another in line through connecting parts 30 in a front-to-rear direction of the plate. The lateral extent of the plurality of the ring parts 26a~26d becomes larger in the front-to-rear direction of the plate such that the extent of the undulations (formed by the connected ring parts) laterally of the plate increases in such direction.

Further, a support member 27 is provided at the rear end of the energy absorbing member 25. The support member 27 has a bilateral pair of bending parts 28, 28 formed with circular holes 29, 29 for insertion of the adjust bolt 22. In addition, a tongue 31 is provided at the front end of the energy absorbing member 25. This tongue 31 is fixedly welded to the lower surface of the steering column 3.

The collapsible steering column apparatus according to the present invention is constructed by, as illustrated in FIGS. 1 and 2, interposing the energy absorbing member 25 assuming the configuration described above between the adjust bolt 22 and the steering column 3. In this type of apparatus, when applying the impulsive force to thrust the steering column 3 forward upon the secondary shock due to a collision, the energy absorbing member 25 permits a forward displacement of the steering column 3 while being plastically deformed to extend the ring parts 26a~26d in the forward direction.

The force required for starting the displacement (elongation) of the energy absorbing member 25 does not increase so much. Hence, the forward displacement of the steering column 3 is smoothly started. At the instant of the secondary shock, the impulsive force acting on the body of the driver can be relieved. In particular, the collapsible steering column apparatus incorporates the energy absorbing member 25, and the ring parts 26a~26d constituting the energy absorbing member 25 are each formed as earlier described so that displacement (elongation) of the energy absorbing member 25 is thereby smoothly started.

Moreover, the ring part 26d at the rear end has the largest width dimension (greatest extent laterally of member 25) among the ring parts 26a~26d. The width dimensions thereof become gradually smaller approaching the ring part 26a at the front end. Based on the forward displacement of the steering column 3, the energy absorbing member 25 elongates. The greater elongation thereof involves a larger force for causing a further forward displacement of the steering column 3.

Consider for example, the longitudinal (front-to-rear) rigidity of the ring part 26d having a large width dimension as compared with that of the ring part 26a having a small width dimension. In this case, the rigidity of the ring part 26d having the large width dimension is smaller than that of the ring part 26a having the small width dimension. Hence, if the force acting in the elongating direction is applied to the energy absorbing member 25 including the plurality of the ring parts 26a~26d having different width dimensions, the ring part 26d having the large width dimension is at first deformed (elongated in the longitudinal direction). The deformation of this ring part 26d progresses to a certain degree. At this stage, the adjacent ring part 26 having the second-largest width dimension begins its deformation. Hereafter, the deformation proceeds sequentially to the ring part 26a having the small width dimension.

Accordingly, the force needed for causing the displacement of the steering column 3 upon the secondary shock is small at the initial stage but increases gradually with a progression of the displacement. It is therefore possible to prevent a serious injury from occurring to the body of the driver by efficiently receiving the impact induced when the body of the driver strikes against the steering wheel 2.

Figure 5:
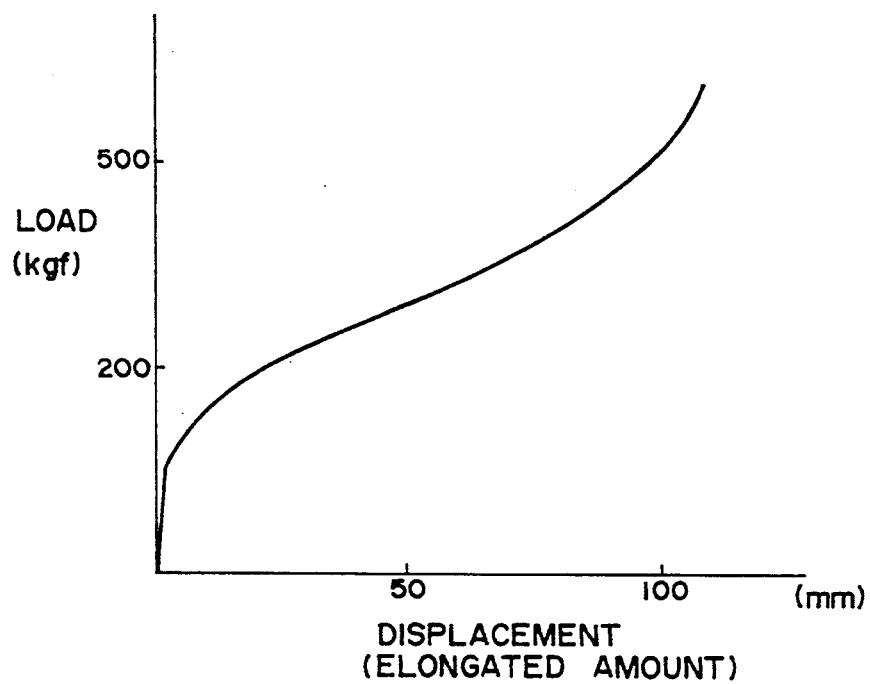
FIG. 5 is a graphic chart showing a relationship between a load applied to the energy absorbing member and an elongated amount.

Note that the sectional configuration of each of the ring parts 26a~26d is not particularly limited. If a square in section is adopted, however, it is feasible to sufficiently ensure the rigidity in the normal state and, besides, to exhibit the energy absorbing function until each of the ring parts 26a~26d is extended out at the time of collision. For instance, the present inventors have sought a relationship between a magnitude of load required for elongating the energy absorbing member 25 and a displacement (elongated amount) of this energy absorbing member 25, wherein each of the ring parts 26a~26d takes a square in section. FIG. 5 shows this relationship.

Figure 6:
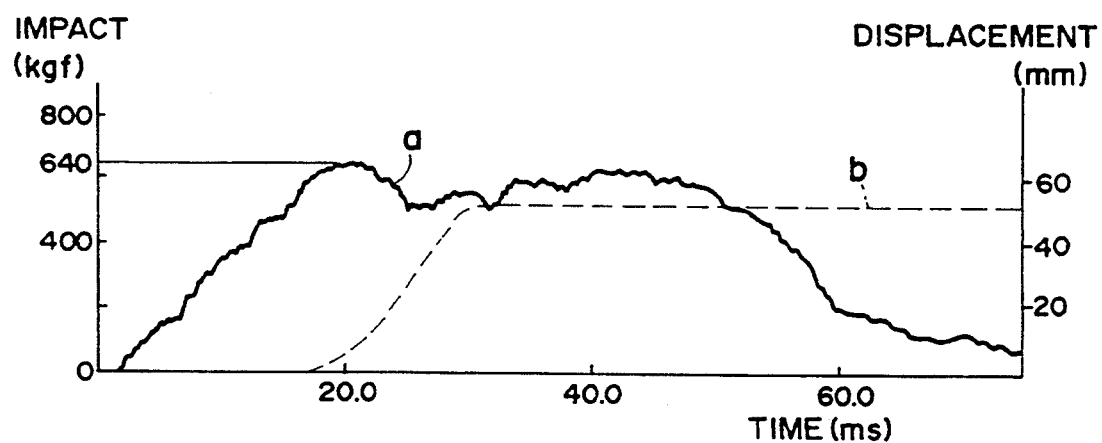
FIG. 6 is a graphic chart showing a relationship between an elapsed time, a magnitude of impact applied to the driver's body and a displacement of a steering wheel at the moment of a secondary shock.

Further, this energy absorbing member 25 is, as illustrated in FIGS. 1 and 2, incorporated into the collapsible steering column apparatus. FIG. 6 shows an elapsed time from the moment of the secondary shock, a magnitude of impact applied to the driver's body striking against the steering wheel and a displacement of the steering column. Referring to FIG. 6, a solid line a indicates a relationship between the elapsed time and the magnitude of impact applied to the driver's body, and the broken line b indicates a relationship between the elapsed time and the displacement of the steering column. The relationships in FIG. 6 are obtained from a test based on FMVSS 202. The early-stage impact applied to the driver increases gradually with a passage of time as seen in FIG. 6. Additionally, it has been confirmed that a maximum value of the impact is 640 kgf and therefore satisfies the safety standard (1134 kgf or under) with substantial margin.

Figure 4:
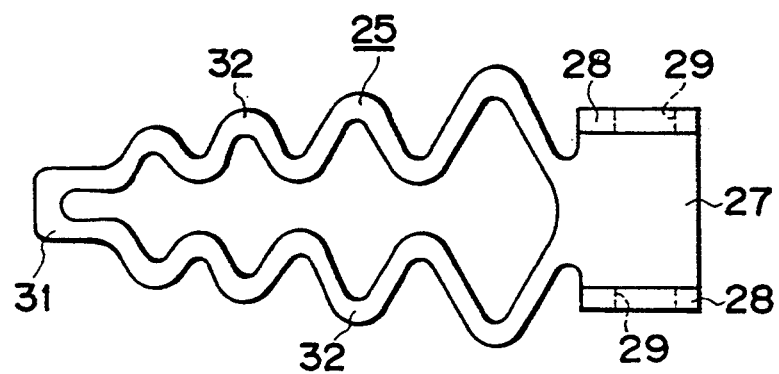
FIG. 4 is a view similar to FIG. 3, illustrating another example of the energy absorbing member.

Note that the configuration of the energy absorbing member 25 may be the one depicted in FIG. 4 in addition to the shape shown in FIG. 3. The energy absorbing member 25 shown in FIG. 4 is formed with a pair of undulatory displacement parts 32, 32 each of whose extent laterally of member 25 decreases progressively, with each undulation, toward the front end from the rear end. The resulting internal configuration is a series of partially open rhomboids continuous to each other between the two displacement parts 32, 32. The action of the energy absorbing member 25 illustrated in FIG. 4 is also substantially the same as the one shown in FIG. 3.

Figure 7:
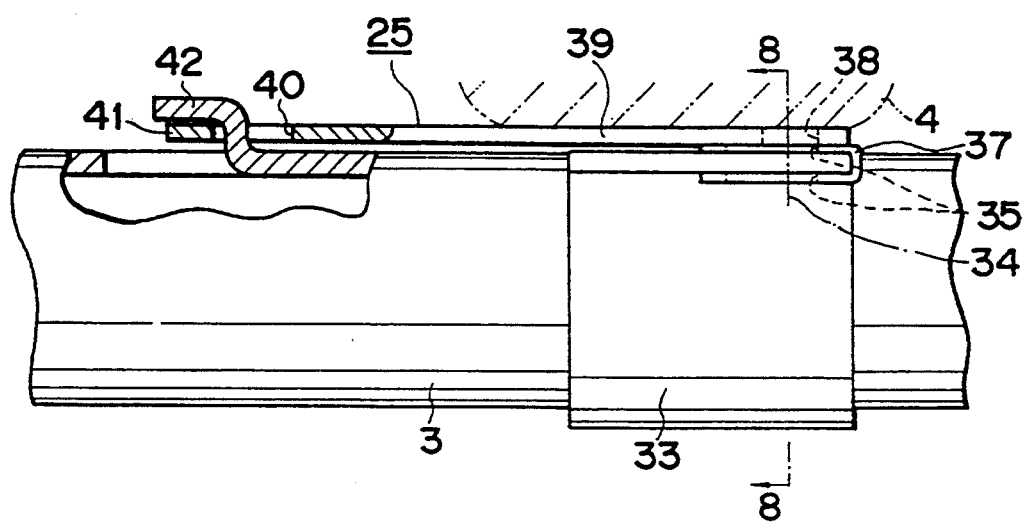
FIG. 7 is a principal side view in vertical section, showing a second embodiment of the present invention.
Figure 8:
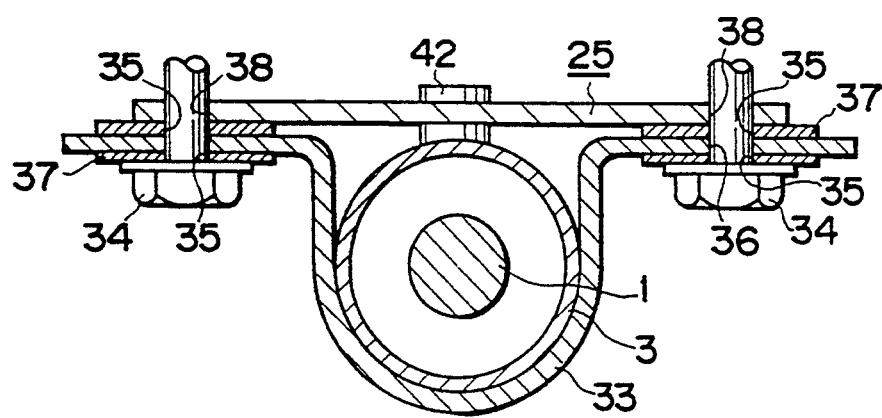
FIG. 8 is a sectional view taken along the line 8—8 in FIG. 7.

Next, a second embodiment of the present invention will be described with reference to FIGS. 7–9. The first embodiment discussed above is designed to incorporate the tilt mechanism for adjusting the height position of the steering wheel. Contrastingly, in the second embodiment, the height position of the steering wheel remains fixed.

A fitting bracket 33 is fixed to the mid-part of the steering column 3. This fitting bracket 33 is fixed to the vehicle body 4 with a pair of right and left bolts 34, 34. Slide plates 37, 37 are formed with circular holes 35, 35. This fitting bracket 33 has U-shaped notches 36, 36 cut in the rear edge (right edge in FIG. 7) thereof. The bolts 34, 34 penetrate the circular holes 35, 35 and the notches 36, 36.

The rear end of the energy absorbing member 25 is sandwiched between the upper surfaces of the slide plates 37, 37 and the lower surface of the vehicle body 4 through the bolts 34, 34. The bolts 34, 34 penetrate the circular holes 38, 38 formed in bilateral ends of the rear end part of the energy absorbing member 25, thereby fixedly supporting the rear end part of the energy absorbing member 25 on the vehicle body 4.

This energy absorbing member 25 also has an undulatory displacement part 39, with the extent of the undulations laterally of the member 25 being successively reduced toward the front end from the rear end. A lock part 41 including a lock hole 40 is formed at the front end of the energy absorbing member 25. Thus, a protrusion 42 formed on the upper surface of the steering column 3 engages with the lock hole 40. The front end of the energy absorbing member 25 is thereby joined to the mid-part of the steering column 3.

When applying the forward impulsive force to the steering column 3 due to the secondary shock, the steering column 3 makes a forward displacement while the bolts 34, 34 escape the notches 36, 36.

Concomitantly, the displacement part 39 of the energy absorbing member 25 elongates, thereby preventing a large impact from exerting on the body of the driver striking against the steering wheel.

Figure 9:
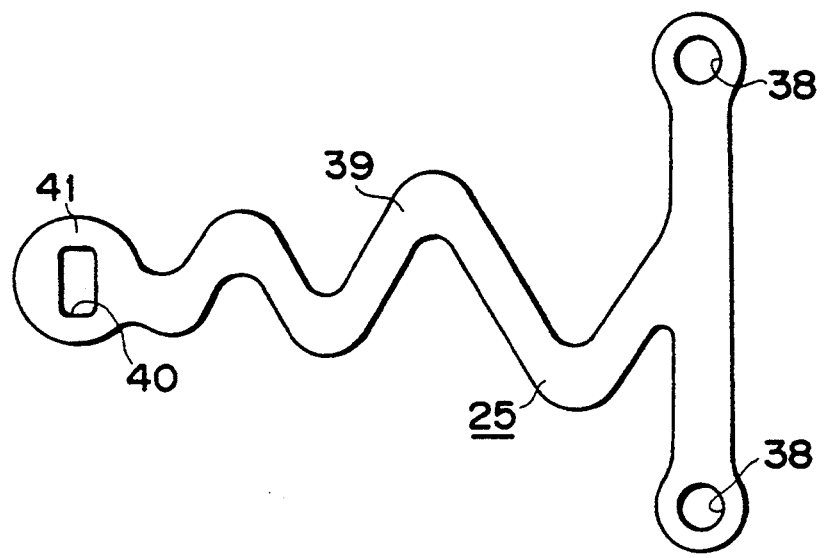
FIG. 9 is a view illustrating an energy absorbing member as viewed from above in FIG. 7.
Figure 10:
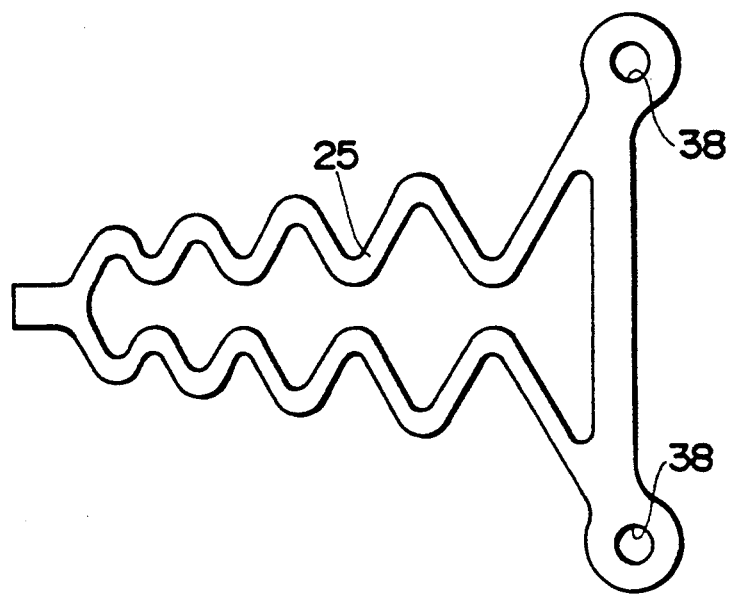
FIG. 10 is a view similar to FIG. 9, showing another example of the energy absorbing member.
Figure 11:
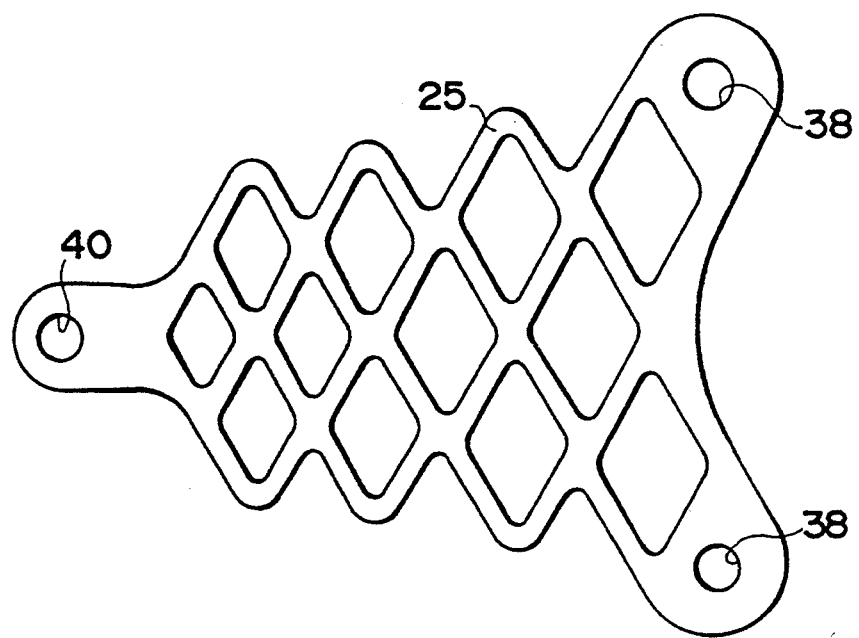
FIG. 11 is a view similar to FIG. 9, showing still another example of the energy absorbing member.

Note that the configuration of the energy absorbing member 25 in the second embodiment also is not limited to the one shown in FIG. 9. Other shapes are adoptable as illustrated in FIGS. 10 and 11. Incidentally, the front end of the energy absorbing member 25 in FIG. 10 is fixedly welded to the steering column 3.

It is apparent that, in this invention, a wide range of different working modes is possible without deviating from the principles and spirit of the invention, the scope of which is defined by the appended claims.

What is claimed is:

1. A collapsible steering column apparatus, comprising:
   a steering column capable of receiving therein a steering shaft having one end to which a steering wheel is fixed; and
   an energy absorbing member composed of a plastically deformable material and having a front end connected to an outer peripheral surface portion of said steering column, a rear end connected to a part fixed to a vehicle body; and an energy absorbing intermediate portion which is substantially flat and which has a laterally undulating configuration, with the lateral extent of the respective undulations relative to a front to rear axis of said energy absorbing member decreasing from said rear end toward said front end thereof.

2. The collapsible steering column apparatus according to claim 1, wherein said extent of the undulations decreases successively from said rear end toward said front end of said energy absorbing member.

3. The collapsible steering column apparatus according to claim 2, wherein said rear end of said energy absorbing member is connected to an adjust bolt of a tilt-type steering column.

4. The collapsible steering column apparatus according to claim 2, wherein said intermediate portion of said energy absorbing member is constructed of a plurality of rings connected to each other successively in a front-to-rear direction of said energy absorbing member, said rings being elongated laterally of said energy absorbing member.

5. The collapsible steering column apparatus according to claim 4, wherein said rear end of said energy absorbing member is joined to an adjust bolt of a tilt-type steering column.

6. The collapsible steering column apparatus according to claim 2, wherein said intermediate portion of said energy absorbing member is constructed of two spaced continuous undulatory members.

7. The collapsible steering column apparatus according to claim 6, wherein said rear end of said energy absorbing member is connected to an adjust bolt of a tilt-type steering column.

8. The collapsible steering column apparatus according to claim 4, wherein portions of said rings defining the undulations are of substantially square cross-section.

9. The collapsible steering column apparatus according to claim 6, wherein each of said undulatory members is of substantially square cross-section.

* * * * *